April 29, 1947.    C. D. FATOR    2,419,555
SELF-THREADING AND LOCKING SCREW
Filed April 19, 1940
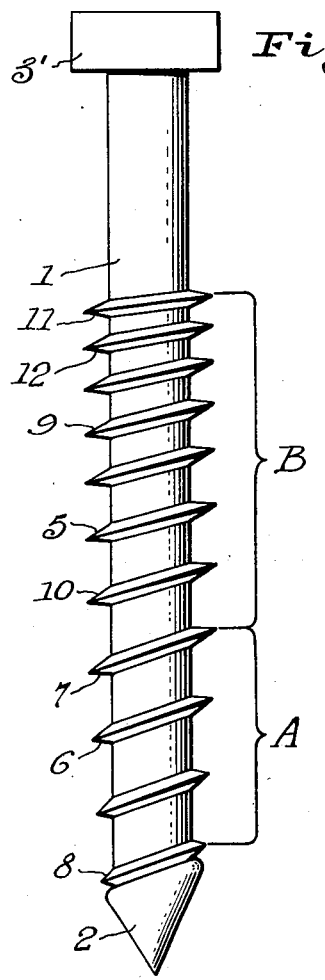
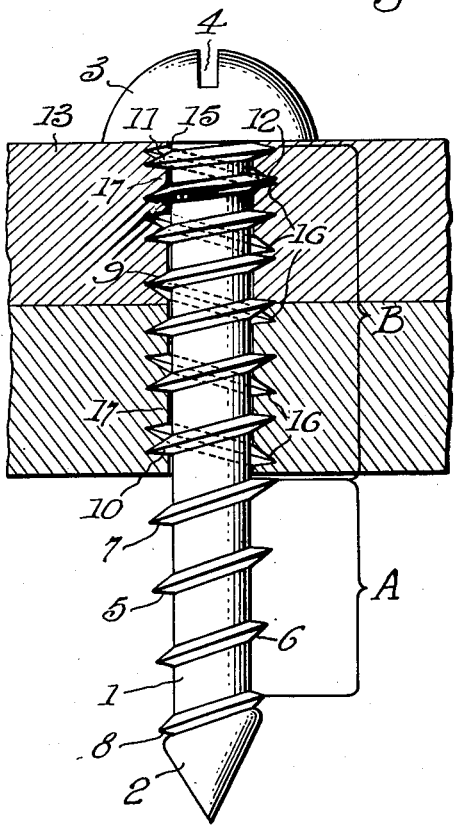
Inventor
Charles D. Fator
By Francis H. Vanderwerker
Attorney Patented Apr. 29, 1947

2,419,555

UNITED STATES PATENT OFFICE 2,419,555

SELF-THREADING AND LOCKING SCREW

Charles D. Fator, San Antonio, Tex.

Application April 19, 1940, Serial No. 330,524

3 Claims. (Cl. 85—46)

(Granted under the act of March 3, 1883, as amended April 30, 1928; 370 O. G. 757)

This invention described herein may be manufactured and used by or for the Government for governmental purposes, without the payment to me of any royalty thereon.

This invention relates to an improvement in screws of the type especially adapted for use in metal fabrication and more particularly to a screw fastener that is provided with a thread adapted to produce its own path in the metal engaged.

One of the objects of the invention is to provide a screw fastener including portions having threads arranged thereon in such a manner that any tendency to loosen the screw fastener from a piece of work causes the threads to make an increasing friction fit with the work, thereby tending to lock the screw fastener from further movement on the work.

Another object of the invention is to provide a screw fastener adapted to readily and easily enter a piece of work without canting or skewing, that is, in a relatively straight position.

Heretofore, the self-threading screw fasteners designed and adapted especially for metal work had threads of constant pitch and depended on a friction tight fit or a lock washer to keep them in place on the work, whereby they were liable to become loose or unscrewed from vibration or other causes.

It is therefore the aim and purpose of this invention to provide a self-threading or locking screw fastener especially adapted for metal work, including an entering end portion having threads of constant pitch and an intermediate portion having threads of decreasing pitch, whereby after the screw fastener has been completely secured or anchored to a piece of work the threads of constant pitch on the entering end portion are caused to make an increasing friction fit with the work and tending to lock the screw fastener from further movement on the work.

With the above and other objects and advantages in view, the invention consists of certain features of construction and operation of parts which will hereinafter appear and in which—

Fig. 1 is a view in side elevation of a screw fastener embodying the features of the present invention fully secured to a piece of work shown in section; and Fig. 2 is a side elevation of the invention embodied in a lag screw.

In the illustrated embodiment characterizing the invention, 1 indicates the body or shank of the improved screw fastener provided at its entering end with a cone or entering point 2, which may be of any taper desired. The opposite end of the body 1 is preferably provided with a suitable head 3 of the ordinary screw type having a kerf 4 for engagement with a screw driver or like instrument. On the body 1 is a single continuous thread or rib 5 made up of a thread-forming portion or section indicated by the bracket A and a thread-forming portion or section indicated by the bracket B, which portions or sections A and B are alined, and, in fact, continuous of each other, with one end of one section joined to one end of another section. The thread-forming portion A of the thread or rib 5 of the screw fastener is provided with any suitable number of threads 6 having a constant pitch but varying in diameter decreasing gradually downward from the thread 7 which has the greatest diameter to the thread 8 which has the least diameter and blends into the body or shank 1 of the screw fastener adjacent to the upper end of the cone or entering point 2.

The screw pitch of the threads 9 of the thread-forming portion B on the screw between the threads 7 and 10 begins the same as the screw pitch of the thread forming portion A and gradually decrease upwardly in pitch from the thread 7 to the thread 11 which blends into the body 1, on the underneath side of the head 3. The pitch of the threads 11 and 12 on the upper end of the body 1 preferably is one-half the pitch of the constant pitch threads 6 on the thread-forming portion A of the screw fastener.

The thread or rib 5, making up the portions or sections A and B, is arranged on a threaded spiral commonly utilized on wood screws; in other words, the thread is of the conventional or standard V-shaped cross section but differing therefrom in that the thread extends from the cone point 2 to the head 3 and differs in the formation of the entering end point of the screw and also of the thread-forming portion B thereof.

As the improved screw is designed and especially adapted for use in metal fabrication and particularly thin material, the thread 5 should be hardened sufficiently in any well-known manner throughout its length so as to enable the thread to cut soft steel or iron without substantial injury to the thread. The hardening of the other parts of the screw besides the thread is merely incidental and is not necessary for the efficient use of the screw.

In carrying out the invention, the screw fastener is illustrated as connecting two metallic plates 13 and 14, together containing an aperture 15 which may be drilled in the plates or otherwise provided therein. The aperture 15 in the plates 13 and 14 is substantially of the same diameter as the cone point 2 of the screw, only being sufficiently larger than the cone point to allow passage thereof through the aperture 15 with a snug fit.

After the cone point 2 of the screw has entered the aperture 15 in the plates 13 and 14, the screw is revolved by means of a screw driver or the like engaging in the kerf 4 thereby causing threads 6 of constant pitch of the thread-forming portion A to enter the aperture 15 in the plates 13 and 14 and to form a path of constant pitch threads 16 therein. The continual rotation of the screw causes the threads 9 of the thread-forming portion B to engage in the aperture 15 in the metallic plates and due to the decreasing screw pitch of the threads 9 they are caused to form a path in the spaces 17 at a different rate between the path of constant pitch threads 16 in the metallic plates, thereby producing in the metallic plates a subsequent or other threaded path of a different pitch than the path of constant pitch threads 16 and displacing other metal from the plates than that displaced by the constant pitch threads 6 of the thread-forming portion A and breaking up the threaded path of constant pitch threads 16 in the plates produced by the constant pitch threads 6, whereby a greater turning effort is required on the screw to cause it to completely enter the aperture 15 of the plates than if the threads 9 of the portion B were of a constant pitch as the threads 6 of the thread-forming portion A. To remove the screw from the metallic plates after it has been secured to the plates would also require considerable turning effort, since the constant pitch threads 6 on the thread-forming portion A would have to reform its path in the metallic plates. Therefore, any tendency to loosen the screw through vibration or other causes from the metallic plates 13 and 14 or other work causes the threads 6 of constant pitch to have an increasing friction fit in the metallic plates, thereby tending to lock the screw fastener from further movement on the work.

It is to be understood that even though the screw fastener is illustrated as being applied to sheets of metal of relatively large thickness for purposes of illustration that the fastener is well adapted for sheets of any thickness of any hard material besides metal, such as Bakelite, hardwood or rubber and the like. It could be adapted for use as a lag screw, illustrated in Fig. 1, the parts of which are indicated by the same reference characters and the same description will apply as for the first mentioned screw except that the head 3' is made square instead of round for engaging with a wrench or like instrument. By turning the lag screw in any suitable hard material having an aperture provided therein, it is advanced in the aperture without the necessity of hammering the screw as is usually required with the ordinary lag screw.

It will thus be seen that there is herein provided a novel screw fastener which is well adapted for all the purposes indicated. Even though there is herein shown certain features of construction and operation of parts, it is nevertheless to be understood that various changes may be made therein if the changes do not depart from the spirit or scope of the claims.

Having described my invention, what I claim as new and wish to secure by Letters Patent is:

1. A device of the character described, wherein a pair of plates are held together by a self-threading screw comprising a body having a single continuous thread thereon and adapted to enter the plates at one end, and wherein a guiding portion is provided on the entering end of said body and a head provided on the other end of said body, said thread comprising alined and joined threaded sections, one of said threaded sections having a constant pitch and decreasing in diameter from another threaded section toward said guiding portion, said first-mentioned threaded section being adapted to form a threaded path having helices of constant pitch in said plates and wherein said second-mentioned threaded section has a constant diameter and decreases in pitch toward said head and is adapted to form a subsequent threaded path between the helices of said prior path and wherein said first-mentioned threaded section of constant pitch will have to reform its path in said plates to disengage the screw therefrom, thereby causing it to have an increasing friction fit with the pair of plates, thus tending to lock said screw from further movement on the pair of plates.

2. A tapping screw adapted for use on material comprising a body having a single continuous thread thereon and adapted to enter the material at one end, a guiding portion on the entering end of said body and a head on the other end of said body, said thread comprising alined and joined threaded sections, one of said threaded sections having a constant pitch and decreasing in diameter from another threaded section toward said guiding portion and adapted to form a threaded path having helices of a constant pitch in said material, the other threaded section having a constant diameter and decreasing in pitch toward and terminating short of said head and also adapted to form a subsequent threaded path of varying pitch between and adjacent to the helices of said prior threaded path, whereby said first-mentioned threaded section of constant pitch will have to reform its path in said material to disengage the screw therefrom, therebey causing it to have an increasing friction fit with the material, thus tending to lock said screw from further movement on the material.

3. The combination of a pair of plates having an aperture therein and a screw threadably mounted in said aperture for connecting said plates together, said screw comprising a body having a single continuous thread thereon and adapted to enter said aperture at one end, a conical shaped guiding portion on the entrance end of said body and a head provided on the other end of said body, said thread comprising alined and joined threaded sections, one of said threaded sections having a constant pitch and decreasing in diameter from another threaded section toward and blending into said conical shaped guiding portion, said first-mentioned threaded section being adapted to form a threaded path having helices of a constant pitch in said plates and said second-mentioned threaded section having a constant diameter and decreasing in pitch from said first-mentioned threaded section toward said head, with the pitch of said last-mentioned threaded section beginning with a pitch equal to the pitch of said first-mentioned section and ending in one-half the pitch thereof, said second-mentioned threaded section being adapted to form a subsequent threaded path of varying pitch between and adjacent to the helices of said prior threaded path, whereby said plates are drawn securely together and said prior threaded path in said plates formed by said first-mentioned threaded section is broken up, thus causing said first-mentioned threaded section to reform its path in the plates to disengage the screw from the plates and causing the screw to have an increasing friction fit with the plates, thus tending to lock said screw from further movement on the plates.

CHARLES D. FATOR.

REFERENCES CITED

The following references are of record in the file of this patent:

UNITED STATES PATENTS

| Number | Name | Date |
| --- | --- | --- |
| 197,467 | Harvey | Nov. 27, 1877 |
| 413,968 | Rogers | Oct. 29, 1889 |
| 1,190,069 | Abernethy | July 4, 1916 |
| 1,980,093 | Rosenberg | Nov. 6, 1934 |
| 2,165,149 | Olson | July 4, 1939 |

FOREIGN PATENTS

| Number | Country | Date |
| --- | --- | --- |
| 12,563 | British | 1909 |